Figure 10:
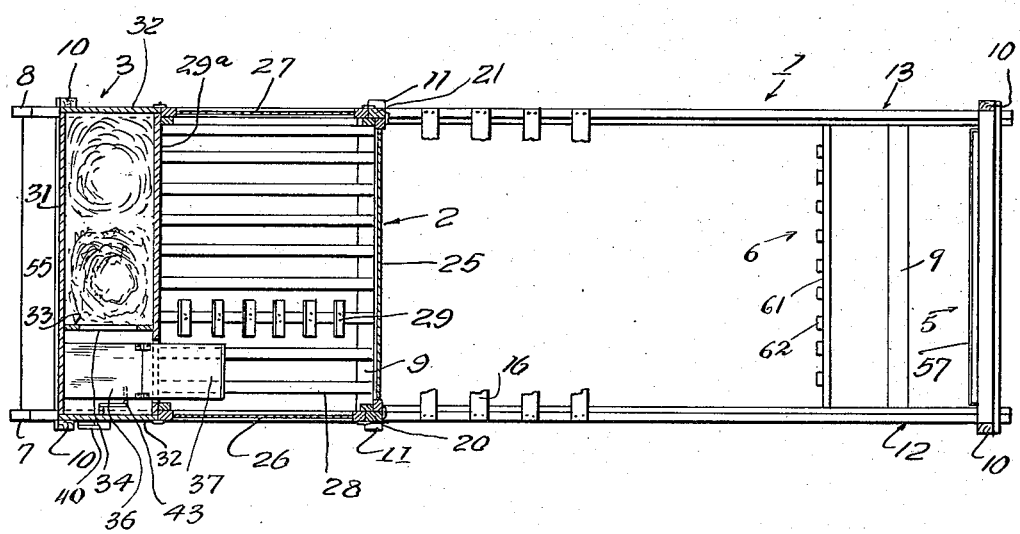

H. E. MALTBY.
PORTABLE CHICKEN COOP.
APPLICATION FILED AUG. 4, 1913.
1,159,323.
Patented Nov. 2, 1915.
3 SHEETS—SHEET 1.
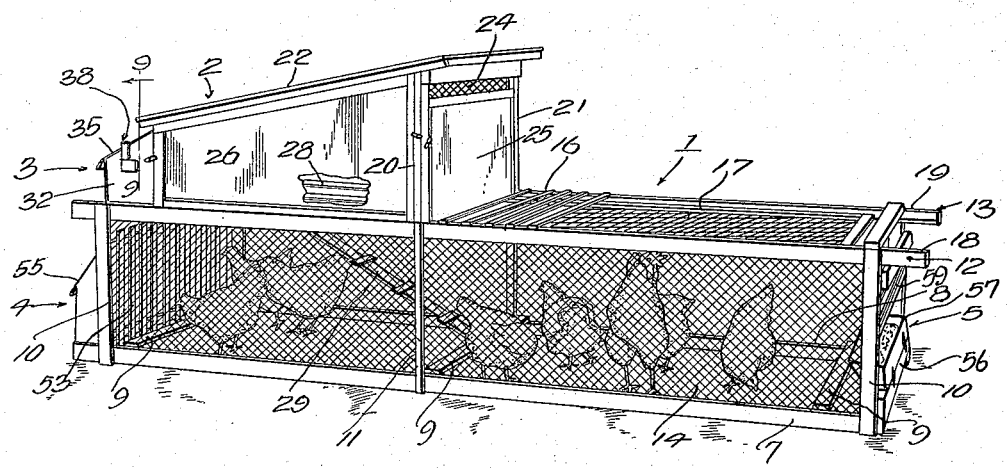
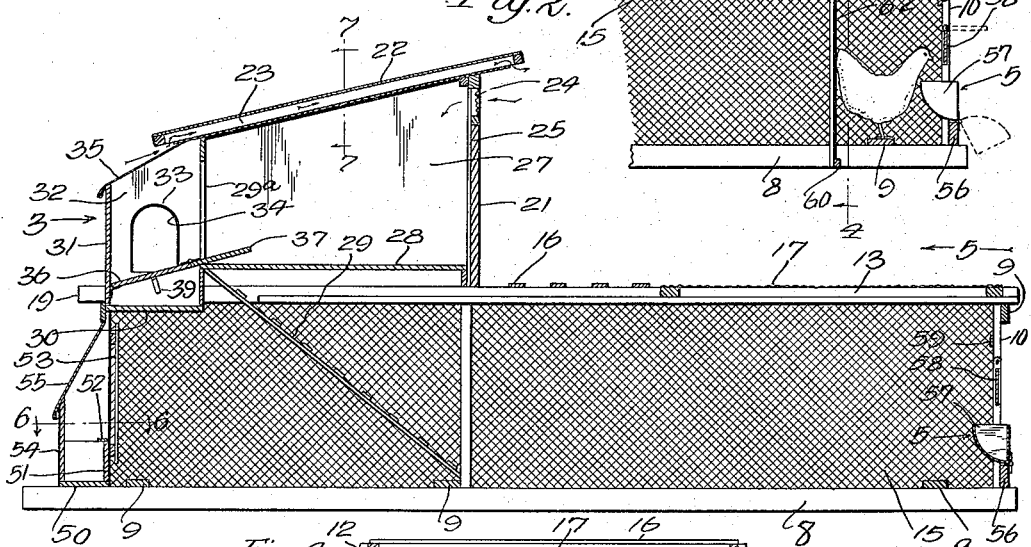
Witnesses:
Clarence J. Williams
Florence Williams
Inventor
Henry E. Maltby
by Serner G. Wells
his Attorney.

H. E. MALTBY.
PORTABLE CHICKEN COOP.
APPLICATION FILED AUG. 4, 1913.
1,159,323.
Patented Nov. 2, 1915.
3 SHEETS—SHEET 2.
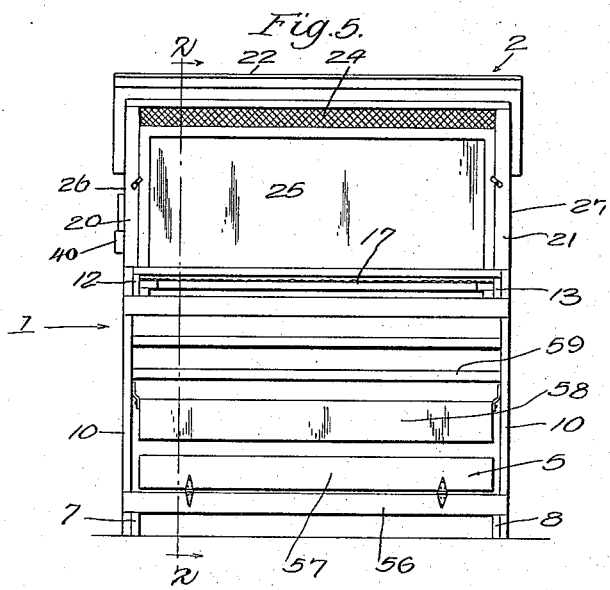
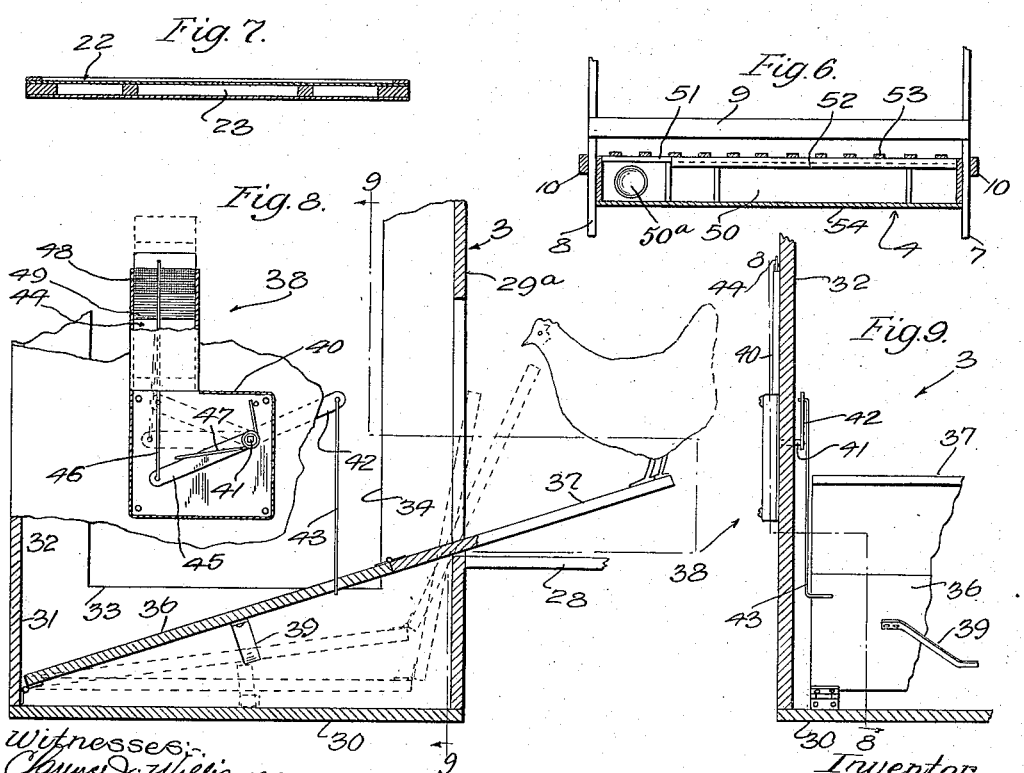

H. E. MALTBY.
PORTABLE CHICKEN COOP.
APPLICATION FILED AUG. 4, 1913.

1,159,323.

Patented Nov. 2, 1915.
3 SHEETS—SHEET 3.

UNITED STATES PATENT OFFICE.

HENRY E. MALTBY, OF LOS ANGELES, CALIFORNIA.

PORTABLE CHICKEN-COOP.

1,159,323.  Specification of Letters Patent.  Patented Nov. 2, 1915.

Application filed August 4, 1913. Serial No. 782,890.

*To all whom it may concern:*

Be it known that I, HENRY E. MALTBY, a citizen of the United States, residing at Los Angeles, in the county of Los Angeles and State of California, have invented a new and useful Portable Chicken-Coop, of which the following is a specification.

Primarily my invention is to make a chicken coop so constructed that all the work of caring for the fowl may be performed from the outside, the intention being to have comparatively small flocks in comparatively small coops, each coop being a complete home for the fowls; and my invention consists of the novel features herein shown, described and claimed.

In the drawings: Figure 1 is a perspective of a coop embodying the principles of my invention. Fig. 2 is a longitudinal sectional elevation, as indicated by the line 2—2 of Fig. 5. Fig. 3 is a fragmentary sectional elevation on the same plane as Fig. 2, and illustrating the operation of catching fowl. Fig. 4 is a cross sectional elevation on the line 4—4 of Fig. 3. Fig. 5 is a front elevation as indicated by the arrow 5 in Fig. 2. Fig. 6 is a fragmentary horizontal sectional detail on the line 6—6 of Fig. 2. Fig. 7 is a sectional detail on the line 7—7 of Fig. 2. Fig. 8 is an enlarged sectional detail of the trap nest, and taken on the line 8—8 of Fig. 9. Fig. 9 is a fragmentary section on the lines 9—9 of Figs. 1 and 8. Fig. 10 is a horizontal section on a plane through the roosting compartment and nesting compartment, the top of the yard space being omitted and broken away so as to show a general plan looking downwardly.

The leading grand divisions of my portable chicken coop are: 1, a portable chicken yard open at the bottom. 2, a roosting compartment carried by the chicken yard. 3, a trap nest communicating with the yard and roosting compartment. 4, a trough for dry feed. 5, a trough for wet feed. 6, a catcher.

The details of the portable chicken yard are as follows: The lower side sills 7 and 8 are connected together by cross pieces 9. Corner posts 10 extend upwardly from near the ends of the lower sills 7 and 8 and intermediate posts 11 extend upwardly from near the centers of the lower sills 7 and 8. The upper sills 12 and 13 are secured to the posts 10 and 11. Chicken netting 14 and 15 is secured in place to the sills and posts to form the sides of the inclosure. The dry feed trough 4 forms one end of the inclosure and the wet feed trough 5 forms the other end. The roosting compartment 2 and the trap nest 3 cover one end of the inclosure. Slats 16 cover the central part of the inclosure and a horizontal sliding screen door 17 covers the other end. The door 17 slides under the slats 16. The upper sills 12 and 13 extend beyond the corner posts 10 so as to form handles 18 and 19 for moving the coop. The ground forms the bottom of the inclosure. The coop may be easily moved sidewise one end at a time to clean the ground.

The details of the roosting compartment 2 are as follows: The trap nest box 3 forms the rear side of the roosting compartment inclosure. The roosting compartment posts 20 and 21 form the front corners of the roosting compartment. The double roof 22 rests upon the nest box 3 and upon the posts 20 and 21, said roof being inclined and there being a passage 23 for an air draft to cool the roof. A screen ventilating panel 24 is inserted below the front and high side of the roof. A solid front panel 25 fits removably between the posts 20 and 21, and removable solid side panels 26 and 27 complete the roost inclosure. The roosting bars 28 are mounted in the inclosure and a stairway 29 leads from the yard.

The details of the trap nest 3 are as follows: The front wall 29$^a$ of the nest inclosure forms the rear wall of the roosting compartment. The floor 30 extends backwardly and the rear wall 31 extends upwardly. The floor 30 is considerably lower than the roosting bars 28 and is between the upper side sills 12 and 13. Solid end walls 32 are inserted. The partition wall 33 has an opening 34, the nest proper being on the farther side of the partition 33 and the trap being on the near side. The lid 35 forms the roof to the nest and provides access to the eggs, said lid being flexibly attached to the rear lower side of the roof 22 and resting upon the wall 31. The false bottom 36 is hinged above the bottom 30 and the trap door 37 is hinged to the free edge of the bottom 36 and extends through the door opening in the wall 29$^a$. The signal mechanism 38 is connected to the false bottom. When the nest is unoccupied and the trap set to admit a hen the trap door 37 extends outwardly through the door opening in a straight line with the false bottom. A leaf spring 39 extends downwardly from the false bottom 36, the tension of the spring being such that it will yield under the weight of a hen and the false bottom and will raise the false bottom a certain distance when the weight is removed. When the hen passes from the trap door 37 through the opening and to the false bottom the trap door will tilt upwardly and close the opening and the hen is trapped in the nest inclosure.

The details of the signaling mechanism 38 are as follows: The casing 40 is mounted upon the outside of the end wall 32. The rock shaft 41 is mounted through the casing and extends through the end wall 32. The crank arm 42 is fixed upon the inner end of the rock shaft 41 and connected to the false bottom 36 by the wire 43 so that the crank arm 42 is operated by the operation of the false bottom. The signal proper is a slide 44 mounted vertically in the casing 40 with its upper end exposed. A crank arm 45 is fixed upon the rock shaft 41 in the casing 40 and connected to the slide 44 by a wire 46. The spring 47 tends to hold the slide 44 down. The two graduated spaces 48 and 49 upon the exposed end of the slide 44 are painted in contrasting colors, as red and black. When the trap is set to admit a hen the slide is down. When the hen passes into the nest the false bottom is depressed, the trap door closed and the slide elevated to show the black. When the hen comes out of the nest and stands upon the false bottom the slide is elevated to show the red space and indicates that the hen has laid an egg and should be released. The attendant should take the mark of the hen, release the hen, reset the trap and mark the egg.

The details of the dry feed trough 4 are as follows: The trough bottom 50 extends cross wise and rests upon the rear ends of the lower sills 7 and 8, outside of the corner posts. The water can 50$^A$ rests upon the bottom 50. The inner wall 51 extends upwardly from the front edge of the trough bottom 50 and a flange 52 extends backwardly from the upper edge of this wall. Slats 53 extend vertically from the wall 51 and complete the rear part of the yard inclosure. The rear cross piece 9 is elevated from the ground and in front of the wall 51 so that a chicken must stand upon this cross piece to reach the feed. If a chicken stands free upon an extended surface it is inclined to move around and scatter the feed, but when it stands upon an elevated perch it will remain stationary upon its feet and not scatter the feed. The rear wall 54 extends upwardly from the rear edge of the bottom 50. The lid 55 is attached to the nest and rests upon the upper edge of the wall 54 to form a cover for the trough and to provide access from the outside. The flange 52 prevents the feed from slopping over into the yard. The chickens will stand still upon the perch put their heads through the slots and eat without bobbing around and scattering the feed.

The details of the wet feed trough 5 are are follows: The board 56 connects the front corner posts 10 and extends upwardly from the sills 7 and 8. The trough 57 is hinged to the upper edge of this board and is overbalanced inwardly so that in its normal upright position it rests upon the board and is accessible to the chickens from the inside of the yard. The trough may be emptied outside of the yard by tipping it forwardly. The horizontally swinging door 58 hangs above the trough 57 and is held closed by gravity. Bars 59 complete the front end of the yard inclosure.

The details of the catcher 6 are as follows: The lower gate bar 60 is short enough to fit between the lower sills 7 and 8 and the upper bar 61 is slightly longer so as to snap into the netting 14 and 15. The slats 62 connect the bars 60 and 61 to form a gate the height of the yard. When the chickens are near the wet feed trough 5 the screen door 17 may be opened and the gate inserted behind the chickens and then the desired chicken may be readily caught and removed.

Thus I have provided a complete home for fowl which may be readily moved step by step, in which all the work may be done from the outside, and in which all the offal falls upon the ground and may be gotten rid of by moving the coop.

I claim:

1. In a chicken coop, lower side sills; cross pieces connecting the side sills; corner posts extending upwardly from near the ends of the lower sills; intermediate posts extending upwardly from near the centers of the lower sills; upper sills secured to the upper ends of the corner posts and the intermediate posts; roosting compartment posts extending upwardly from the intermediate posts above the upper sills; a nest inclosure resting upon the ends of the upper sills and comprising a wall serving as the rear wall of the roosting compartment and the front wall of the nest inclosure; a floor extending backwardly from this wall, a second wall extending upwardly from the rear side of the floor, end walls between the front and rear walls extending upwardly from the floor; a double roof resting upon the front wall of the nest inclosure and upon the roosting compartment posts and inclined from the posts downwardly and backwardly; a screen ventilating panel inserted vertically below the high side of the roof and between the roosting compartment posts; a solid front panel fitting removably between the posts below the screen; and solid side panels fitting removably between the posts and the nest inclosure.

2. In a chicken coop, lower side sills; cross pieces connecting the lower side sills; corner posts extending upwardly from near the ends of the lower side sills; intermediate posts extending upwardly from near the centers of the lower side sills; upper sills secured to the upper ends of the corner posts and the intermediate posts the ends of the upper sills extending beyond the corner posts and serving as handles for moving the coop; rigid posts extending upwardly from the upper sills near their longitudinal centers; a nest box mounted upon the ends of the upper sills; a double roof extending from the top of the nest box upwardly and resting upon the rigid post; a removable panel between the rigid posts; and removable panels between the rigid posts and the nest box.

HENRY E. MALTBY.

Witnesses:
  SEMER G. WELLS,
  CLARENCE J. WILLIAMS.

Copies of this patent may be obtained for five cents each, by addressing the "Commissioner of Patents, Washington, D. C."